United States Patent [19]

Mori

[11] Patent Number: 4,663,857
[45] Date of Patent: May 12, 1987

[54] DEVICE FOR MEASURING INTERFERENCE AND WALL THICKNESS OF A HALF CYLINDRICAL PLAIN BEARING

[75] Inventor: Sanae Mori, Nagoya, Japan

[73] Assignee: Daido Metal Company Ltd., Nagoya, Japan

[21] Appl. No.: 786,081

[22] Filed: Oct. 10, 1985

[30] Foreign Application Priority Data

Feb. 8, 1985 [JP] Japan .................. 60-23192

[51] Int. Cl.⁴ .............................................. G01B 7/28
[52] U.S. Cl. ........................................ 33/517; 33/543; 33/557; 33/DIG. 17
[58] Field of Search ............... 33/517, 507, 557, 558, 33/172 R, 543, DIG. 2, DIG. 8, DIG. 17

[56] References Cited

U.S. PATENT DOCUMENTS

| | | | |
|---|---|---|---|
| 2,109,568 | 3/1938 | Hixson | 33/517 |
| 2,448,314 | 8/1948 | Kavanagh | 33/DIG. 17 |
| 3,864,835 | 2/1975 | Morisaki | 33/517 |
| 3,928,918 | 4/1975 | Morisaki | 33/172 R |
| 4,150,468 | 4/1979 | Harbottle | 33/DIG. 17 |
| 4,601,109 | 7/1986 | Klingler et al. | 33/517 |

FOREIGN PATENT DOCUMENTS

| | | | |
|---|---|---|---|
| 29679 | 6/1960 | Japan . | |
| 20906 | 3/1976 | Japan . | |
| 1421887 | 4/1976 | United Kingdom . | |
| 2064132 | 6/1981 | United Kingdom | 33/543 |

Primary Examiner—Willis Little

[57] ABSTRACT

A device for measuring interference and wall thickness of a half cylindrical plain bearing includes a bearing support block provided with a substantially semi-cylindrical shaped recess for receiving the plain bearing, a pressing mechanism for closely pressing the plain bearing against the recess, a substantially semi-columnar shaped wall thickness measuring head having a smaller outer diameter than the inner diameter of the plain bearing when it closely contacts with the recess, and a positioning mechanism for establishing a predetermined positional relationship between the recess and the wall thickness measuring head upon measurement. The bearing support block carries a detector or detectors for measuring interference of the half cylindrical plain bearing, and the wall thickness measuring head incorporates measuring instruments such as air micrometers.

9 Claims, 13 Drawing Figures

DEVICE FOR MEASURING INTERFERENCE AND WALL THICKNESS OF A HALF CYLINDRICAL PLAIN BEARING

BACKGROUND OF THE INVENTION

The present invention relates to a device for simultaneously measuring interference and wall thickness of a half cylindrical plain bearing which is applied on sliding parts of vehicles, ships, industrial equipments, office machines or acoustic apparatus.

Recently, requirements for quality, in particular, precision of half cylindrical plain bearings have become strict so that one hundred percent inspection is required upon shipment of such bearings. Japanese Utility Model Publication No. 29679/1960 and Japanese Patent Publication No. 20906/1976, both of which are owned by the applicant of this application, discloses a device for measuring interference of a half cylindrical plain bearing and a device for measuring wall thickness of such plain bearing, respectively. However, there has been no device so far which is capable of simultaneously measuring both interference and wall thickness of such plain bearing. Therefore, in the prior measurement of a half cylindrical plain bearing, separate devices have been needed to measure interference and wall thickness, thus making such measurement time-consuming and inefficient. Moreover, the prior measurement of wall thickness of such bearing involves the following disadvantages. For reasons in terms of functions, a half cylindrical plain bearing has a thicker wall thickness in the middle portion in a circumferential direction than in the remaining portions and has a slightly thin wall thickness near the end portions in the circumferential direction. Accordingly, wall thickness of a half cylindrical plain bearing is measured in the following manner. Firstly, wall thickness at a central point, points spaced therefrom by 30 degrees and by 60 degrees in circumferentially opposite directions, which points are positioned near one axial edge of the bearing, is measured in this order, and an operator memorizes the measurement at the central point and keeps a record of differences between the measurement at the central point and those at the points spaced therefrom by 30 degrees and 60 degrees in circumferentially opposite directions, which differences are mentally calculated. Thereafter, wall thickness at five points positioned near the other of the axial edges of the bearing is measured in a similar manner. As the above measurement of wall thickness is performed at ten points of the bearing, and an operator memorizes the measurements and calculates the differences between the measurements mentally, it takes about nine to ten seconds to measure wall thickness of a single plain bearing. Furthermore, a half cylindrical plain bearing receives undesirable depressions at its inner and outer peripheral surfaces upon measurement of its wall thickness by contacting with a pressing member and anvil of a measuring apparatus and a rod of a dial gauge.

As described above, in the prior art, interference and wall thickness of a half cylindrical plain bearing are measured by separate measuring devices, and much time and labor are required in the measurement. Moreover, depressions are disadvantageously produced on a half cylindrical plain bearing after measurement.

SUMMARY OF THE INVENTION

The present invention provides a device for measuring interference and wall thickness of a half cylindrical plain bearing, said device comprising a bearing support means including a bearing support block provided with a substantially semi-cylindrical recess for receiving the half cylindrical plain bearing to be measured, and one or more detectors, a pressing mechanism for pressing the bearing into close contact with the recess, and a substantially semi-columnar shaped wall thickness measuring head having a smaller outer diameter than the inner diameter of the bearing when it closely contacts with the recess, said wall thickness measuring head being adapted to be placed in a predetermined positional relationship with the recess of the bearing support block upon measurement.

DESCRIPTION OF THE PREFERRED EMBODIMENTS

Figure 1:
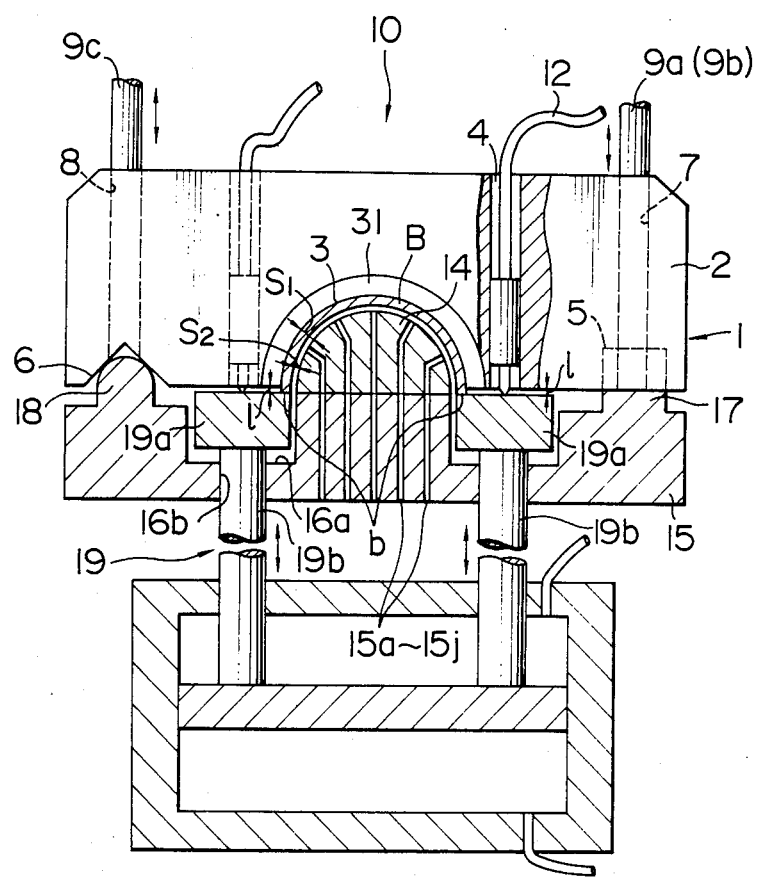
FIG. 1 is a fragmentary sectional view of a device constructed in accordance with a first embodiment of the invention for measuring interference and wall thickness of a half cylindrical plain bearing.
Figure 2:
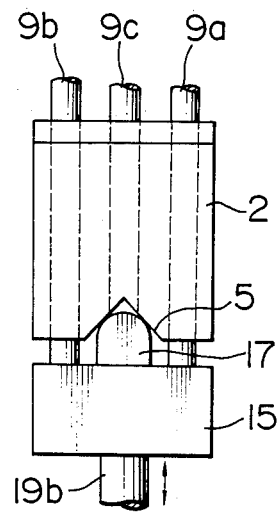
FIG. 2 is a side elevational view of the device shown in FIG. 1.
Figure 3:
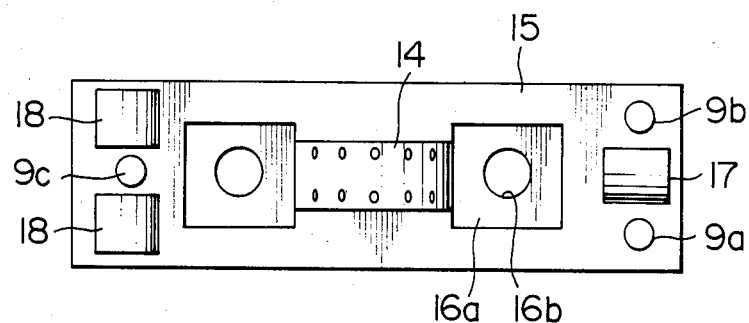
FIG. 3 is a plan view of a wall thickness measuring head supporting block of the device shown in FIG. 1.

Referring to FIGS. 1 to 3, a device constructed in accordance with a first embodiment of the present invention and for measuring interference and wall thickness of a half cylindrical plain bearing. The device comprises a bearing support means 1 supported by a frame (not shown), a pair of detectors 12 mounted on the bearing support means, and a support block 15 for releasably supporting a wall thickness measuring head 14. The bearing support means 1 comprises a bearing support block 2 which includes a detachable jig 31 formed with a substantially semicylindrical shaped recess 3 for receiving therein a half cylindrical plain bearing. Formed in the bearing supporting block are a pair of through holes 4 for receiving therein detectors 12, a first positioning recess 5 for positioning the wall thickness measuring head 14, and a pair of second positioning recesses 6. The bearing supporting block 2 is further formed at positions on the opposite sides of the first positioning recess 5 with a pair of first through holes 7, and at a position between the second positioning recesses 6 with a second through hole 8. A pair of first cylinder rods 9a, 9b extend through the first through holes 7 while a second cylinder rod 9c extends through the second through hole 8. These cylinder rods are connected to the wall thickness measuring head support block 15 to drive the same toward and away from a bearing support block 2.

The detectors 12 may be an electric micrometer, a dial gauge, a linear scale of linear encoder type or a dial gauge of strain-gauge type.

Figure 4:
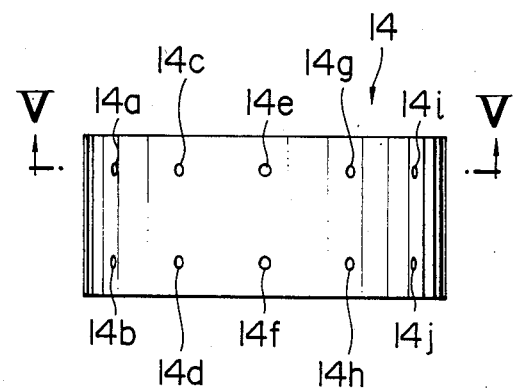
FIGS. 4 and 5 are plan view and sectional view of a wall thickness measuring head.
Figure 5:
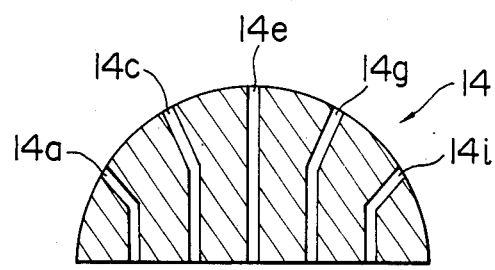
Figure 6:
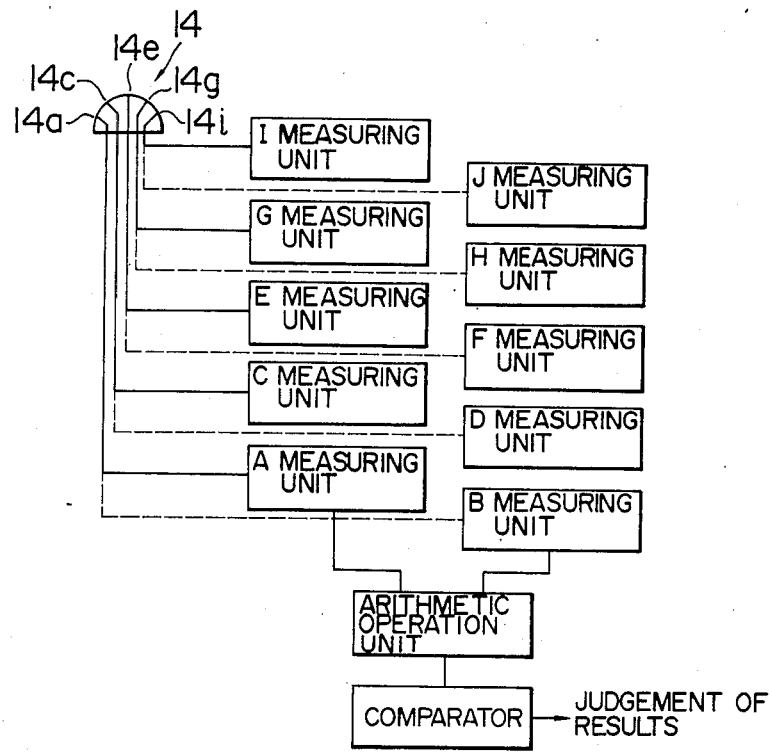
FIG. 6 is a diagram showing a connection between the wall thickness measuring head and measuring instruments.

The wall thickness measuring head supporting block 15 mounts thereon detachably the wall thickness measuring head 14 having a substantially semi-cylindrical shape, of which dimensions correspond to an inner diameter of a half cylindrical plain bearing. As shown in FIGS. 1, 4 and 5, the wall thickness measuring head support block 14 is formed with a plurality of air nozzles 14a to 14j which serve to feed compressed air at a predetermined pressure. The wall thickness measuring head supporting block 15 are formed with a plurality of air passages 15a to 15j which correspond with the air nozzles of the wall thickness measuring head 14 and which are connected to corresponding measuring units A to J which in turn connected to a comparator through an arithmetic operation unit (see FIG. 6).

A pressing mechanism may comprise a pneumatic or hydraulic reciprocating cylinder having piston rods 19b which carry a pressing head 19a.

The wall thickness measuring head supporting block 15 are formed at its top surface with first and second positioning projections 17, 18 which mate with the first and second positioning recesses 5, 6, respectively. Each of the first and second positioning projections 17, 18 is of a substantially semi-columnar shape while each of the first and second positioning recesses 5, 6 is inverse V-shaped in section, as shown in FIGS. 1 and 2. The wall thickness measuring head supporting block 15 is formed with recesses 16a each having a rectangular-shaped cross-section and receiving therein the pressing head 19a, and with circular holes 16b through which the piston rod 19b extends.

Figure 7:
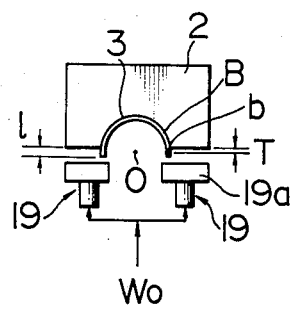
FIGS. 7 to 9 are views illustrating a principle of operation in measuring the interference of a half cylindrical plain bearing in the present invention.
Figure 8:
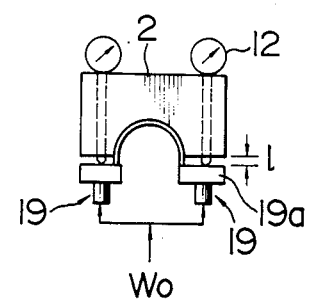
Figure 9:
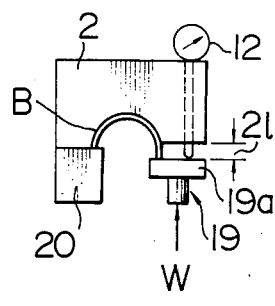
Figure 10:
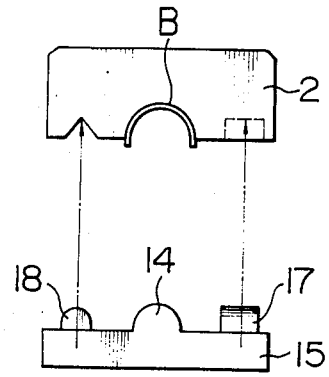
FIGS. 10 to 12 are views illustrating relationships between associated parts of the device in measurement of interference in the present invention.
Figure 11:
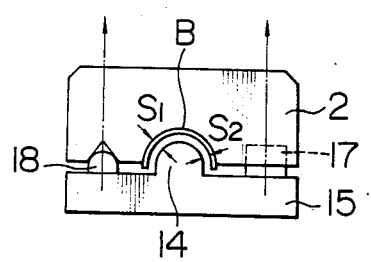
Figure 12:
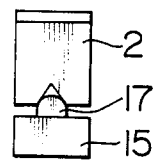

The principle of operation of the device constructed in accordance with the present invention will be described hereinbelow with reference to FIGS. 7 to 11. FIGS. 7 to 9 show the manner in which interference is measured, and FIGS. 10 to 12 show the manner in which wall thickness of a bearing is measured. In fact, the present device provides simultaneous measurement of interference and wall thickness of a half cylindrical plain bearing. In FIG. 7, a half cylindrical plain bearing B to be measured is shown being inserted in the semi-cylindrical shaped recess 3 of the bearing support block 2, which recess is finished to have an inner diameter corresponding to the outer diameter of the bearing B. The end surfaces b of the bearing B is pressed by the pressing heads 19a of the pressing mechanism 19 under a constant load Wo, so that the outer peripheral surface of the bearing B is caused to closely contact with the inner surface of the recess 3 of the bearing support block 2.

In the position shown in FIG. 8, the detectors 12 measure the interference l of the bearing B which corresponds to a clearance between the underside of the bearing support block 2 and the top surfaces of the pressing heads 19a. As the pressing load Wo under which the bearing B is pressed to closely contact with the inner surface of the recess 3 of the bearing support block 2 is maintained constant, the interference l is varied with the height of the half cylindrical plain bearing. Therefore, the height of the bearing can be known by measuring the interference l.

FIG. 9 shows a modification in which one of the pressing heads is replaced by a stationary block 20. With this arangement, the stationary block 20 is first raised to closely contact with the underside of the bearing support block 2 under a larger load than the pressing load of the pressing head 19a. Then the pressing head 19a is raised to press one end surface b of the half cylindrical plain bearing B by a constant load W which is about half the pressing load Wo in FIG. 8, thereby causing the outer peripheral surface of the half cylindrical plain bearing B to closely contact with the surface of the recess of the bearing support block 2. In this position, a clearance between the underside of the bearing support block 2 and the top surface of the pressing head 19a is measured by the detector 12. In this case, the measured clearance is twice the interference l in FIG. 8.

FIGS. 10 and 11 shows that the positional relationship between the recess 3 of the bearing support block 2 and the wall thickness measuring head supporting block 14 is always constant when the wall thickness of the half cylindrical plain bearing B is measured. When the half cylindrical plain bearing B is placed in the recess 3 of the bearing support block 2 to press thereagainst (see FIG. 10), the cylinder (not shown) is actuated to lift the wall thickness measuring head supporting block 15 connected to the first and second cylinder rods (not shown). When the first and second positioning projections 17, 18 of the wall thickness measuring head supporting block 15 perform linear contact with the corresponding first and second positioning recesses 5, 6 of the bearing support block 2 (see FIGS. 11 and 12), a clearance S1 between the recess 3 of the bearing support block 2 and the wall thickness measuring head supporting block 15, hence the wall thickness measuring head 14 becomes constant. In this position, the pressing heads 19a of the pressing mechanism 19 press against the end surfaces b of the half cylindrical plain bearing B to cause the bearing to closely contact with the surface of the recess 3 of the bearing support block 2, as described with respect to FIG. 8. The pressurized air fed to the wall thickness measuring head 14 through the air passages 15a to 15j of the wall thickness measuring head supporting block 15 from a pressurized air source passes through the air nozzles 14a to 14j of the wall thickness measuring head 14 to strike against the inner surface of the half cylindrical plain bearing B at points facing the outlets of the air nozzles, thereby enabling measuring a clearance S2 between the inner surface of the bearing and the wall thickness measuring head 14 by means of the measuring units A to J. The respective measurements thus obtained are transmitted through the arithmetic operation unit to the comparator to be judged. The measuring units A to J are air micrometers, but may be other suitable measuring instruments such as an electric inductance type displacement meter, electric capacitance type displacement meter, photoelectric type displacement meter (laser micrometer), these measuring instruments being embeded in the wall thickness measuring head 14 in use.

Figure 13:
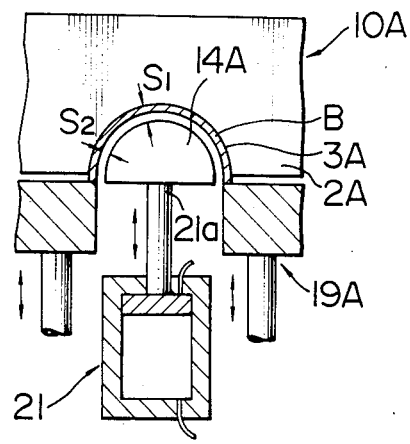
FIG. 13 is a fragmentary sectional view of a device constructed in accordance with a second embodiment of the present invention for measuring interference and wall thickness of a half cylindrical plain bearing.

FIG. 13 shows a device 10A constructed in accordance with a second embodiment of the present invention and for measuring an interference and wall thickness of a half cylindrical plain bearing. The device is different from the device shown in FIG. 1 in that the wall thickness measuring head 14A is directly connected to a rod 21a of a hydraulic cylinder 21 to be moved up and down thereby. The device shown in FIG. 13 is similar to the device of FIG. 1 in that there is produced a predetermined clearance S1 between the recess 3A of the bearing support block 2A and the wall thickness measuring head 14A when the latter is lifted.

According to the present invention, interference and wall thickness of a half cylindrical plain bearing are simultaneously measured, and wall thickness is automatically measured at multi-points of the bearing. The result of measurement is electrically read to be judged, so that differences between individuals are avoided to increase reliability in measurement. Furthermore, any indentations produced in half cylindrical plain bearings in the measurement of the prior art can be eliminated to contribute to assurance of quality.

What is claimed is:

1. A device for measuring interfernce and wall thickness of a half cylindrical plain bearing, said device comprising: a bearing support means including a bearing support block provided with a substantially semi-cylindrical recess for receiving the half cylindrical plain bearing to be measured; one or more detectors mounted on said bearing support means; a pressing mechanism for pressing said bearing into close contact with said recess; and a substantially semi-columnar shaped wall thickness measuring head having a smaller outer diameter than the inner diamter of said bearing when sai dbearing closely contacts with said recess, said wall thickness measuring head being adapted to be placed in a predetermined positional relationship with the recess of said bearing support block upon measurement, and said wall thickness measuring head further comprises measuring instruments, an arithmetic operation unit and a comparator for judging the result of measurement.

2. A device as set forth in claim 1, wherein said wall thickness measuring head is adapted to be spaced from said bearing with a clearance therebetween.

3. A device as set forth in claim 2, further comprising a positioning mechanism for establishing a predetermined positional relationship between said recess and said wall thickness measuring head.

4. A device as set forth in claim 1, wherein said detector is a micrometer or dial guage.

5. A device as set forth in claim 1, wherein said pressing mechanism includes a pressing head means adapted to abut against at least one of the circumferential end surfaces of said bearing.

6. A device as set forth in claim 1, wherein said measuring instrument is an air micrometer, and wherein a plurality of through holes for passing therethrough air flow under a predetermined pressure are formed in said wall thickness measuring head at positions corresponding to the portions of said bearing being measured.

7. A device as set forth in claim 1 further comprising a positioning mechanism for establishing a predetermined positional relationship between said recess and said wall thickness measuring head.

8. A device as set forth in claim 2, wherein said pressing mechanism includes a pressing head means adapted to abut against at least one of the circumferential end surfaces of said bearing.

9. A device as set forth in claim 8, further comprising a positioning mechanism for establishing a predetermined positional relationship between said recess and said wall thickness measuring head.

* * * * *